Nov. 14, 1967  R. S. DJORUP  3,352,154
HEATED ELEMENT FLUID FLOW SENSOR

Filed June 16, 1966  3 Sheets-Sheet 1

INVENTOR
ROBERT S. DJORUP
BY
Weingarten, Orenbuch & Lahive
ATTORNEYS

Nov. 14, 1967 R. S. DJORUP 3,352,154
HEATED ELEMENT FLUID FLOW SENSOR
Filed June 16, 1966 3 Sheets-Sheet 3

INVENTOR
ROBERT S. DJORUP
BY
Weingarten, Ozenbuch & Lahive
ATTORNEYS

United States Patent Office 3,352,154
Patented Nov. 14, 1967

3,352,154
HEATED ELEMENT FLUID FLOW SENSOR
Robert S. Djorup, 20 Lovewell Road,
Wellesley, Mass. 02181
Filed June 16, 1965, Ser. No. 464,312
4 Claims. (Cl. 73—189)

ABSTRACT OF THE DISCLOSURE

A fluid flow sensor is constructed of a refractory body having a surface of revolution to which adhere an electrically conductive ring and a pair of electrically conductive strips. The strips are spaced apart upon the body's surface and each strip is disposed at an angle to the ring. The strips and the ring are made of a material exhibiting a change in electrical resistivity as a function of temperature. Electrical connections are provided to permit each strip and the ring to be separately heated by its own electrical current.

---

Figure 1:
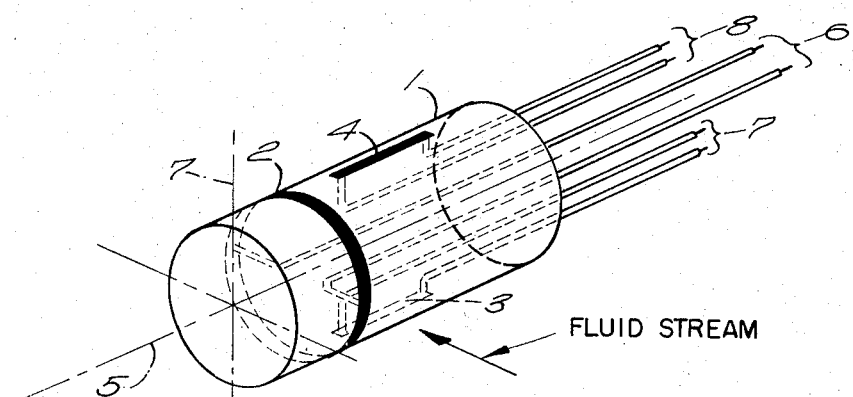

This invention relates in general to sensing apparatus for ascertaining motion relative to a fluid and particularly in concerned with sensing apparatus employing heated conductors for determining speed and direction of motion relative to a fluid in which the sensor is immersed.

The invention, more precisely concerns the measurement of the flow or other motion of gases, such as air, and other fluids and conversely, to the motion of bodies immersed therein. The use of anemometers of the hot wire type to sense fluid flow properties is not new. A conventional method, used in the laboratory to measure fluid flow properties, is to immerse in the fluid a solid metal wire which exhibits a change in resistivity as a function of temperature and heat the wire by causing an electric current to flow in it. As the cooler fluid flows past the wire, the transfer of heat causes variations in the temperature of the wire and corresponding variations in the electrical resistance of the wire. The rate at which the heat from the wire is transferred to the fluid is a measure of the fluid's mass rate of flow or its velocity.

Use of the hot wire anemometer outside of the laboratory has generally been avoided because of the hot wire's extreme fragility and the complexity of the associated electrical circuits. Further, as pointed out in U. S. Patent No. 2,870,305, the conventional hot wire anemometer is unable to respond to instantaneous fluctuations in the fluid flow because of the wire's thermal resistance and the heat stored in the wire. To provide a hot element anemometer that responds with great rapidity to fluctuations in the rate of fluid flow, it was proposed by Ling, the inventor in Patent No. 2,870,305, to mount a thin metal film upon an electrically non-conductive body and cause the film to be heated by the passage through it of an electrical current. Ling proposed to employ a "tenuous" film, having a thickness of substantially one millionth of an inch, secured upon a wedge shaped body. Because of the microscopically thin film of metal used in the Ling fluid flow probe, the employment of that probe in an environment where the metal film is subject to abrasion by dust particles or to erosion by the weather is largely prohibited.

The objective of the invention is to provide a fluid flow sensor employing heated metal elements mounted upon a rigid support in a manner conducive to the determination of the speed and direction of a fluid stream in which the sensor is immersed. As the sensor may be required to withstand abrasion by dust in the atmosphere and erosion by the weather, the heated metal elements are of sufficient thickness to remain intact over a lengthy period despite abrasion and erosion. To promote the transfer of heat from the elements of the fluid stream, the elements are preferably formed as broad ribbons or films to present a large surface to the fluid stream.

The invention resides in a fluid flow sensor having a refractory body providing an electrically insulated geometric surface of revolution to which the heated metal elements adhere. The heated elements are fabricated of a material that exhibits a change in electrical resistivity as a function of temperature. At least one of the heated elements is a ring that encircles the refractory body and has electrical connections which permit the ring to be heated by the passage through it of an electrical current. The other heated elements are flat strips or ribbons which are arranged at separated locations upon the surface and are angularly disposed with respect to the ring. Electrical connections extend from the flat strips to permit those elements to be heated by the passage of an electrical current. The configuration of the heated elements and their placement upon the surface of the refractory body are the principal features of the invention.

Figure 2:
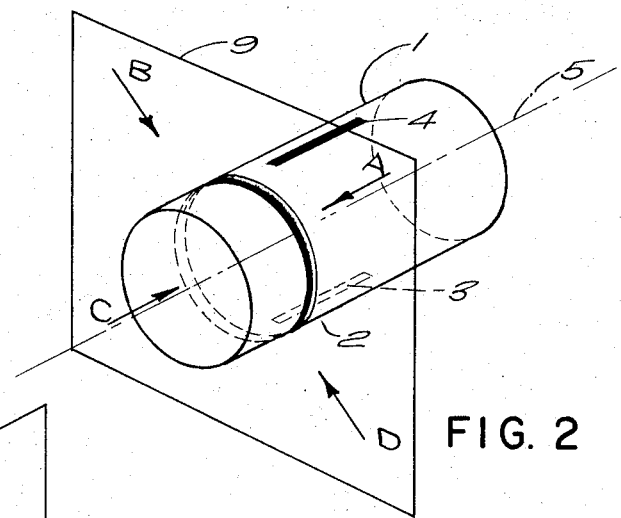
Figure 3:
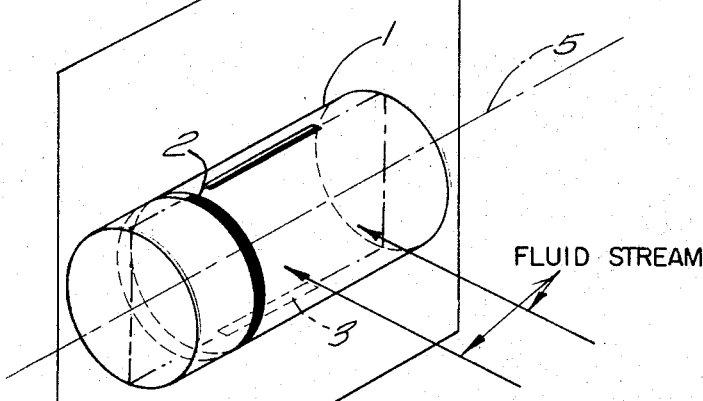
Figure 4:
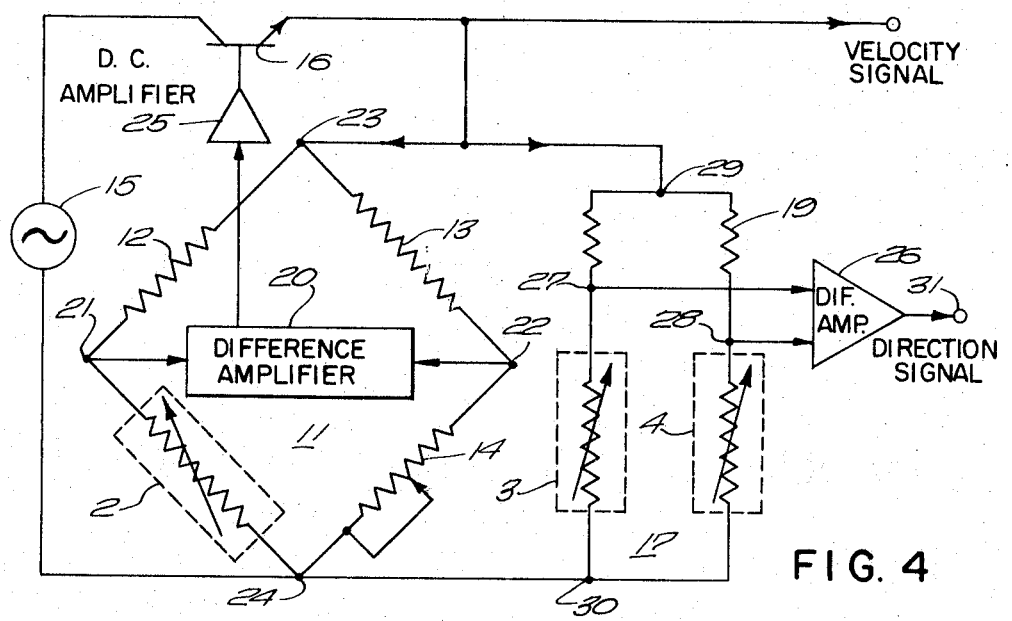
Figure 5:
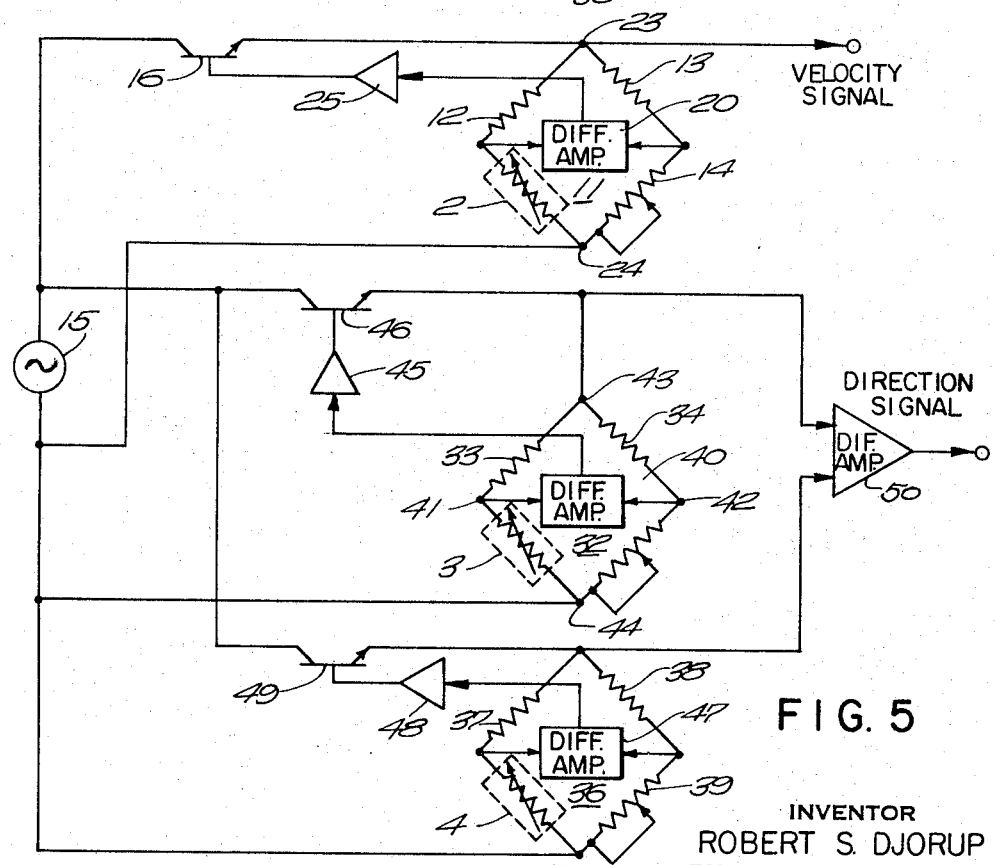
Figure 6:
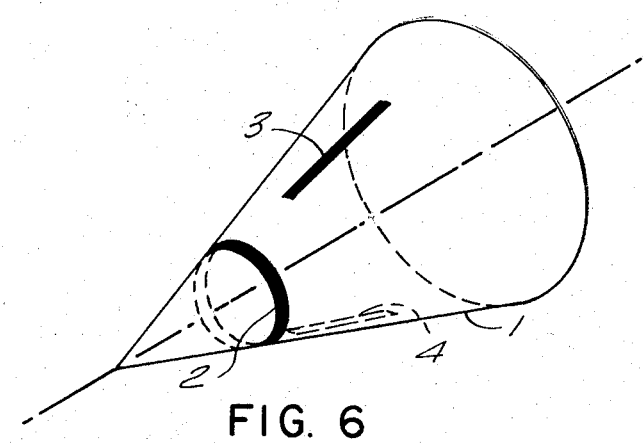
Figure 7:
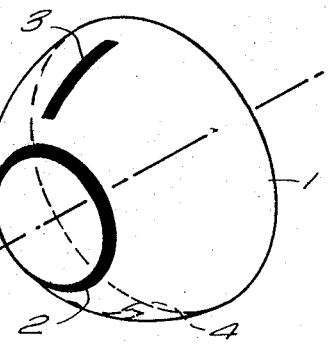
Figure 8:
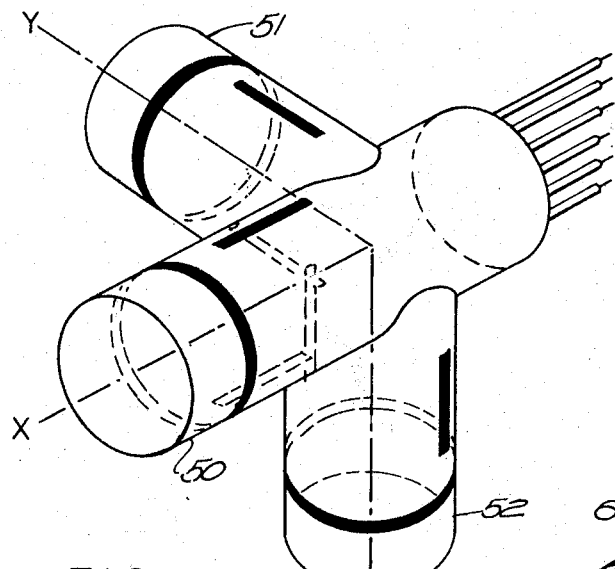
Figure 9:
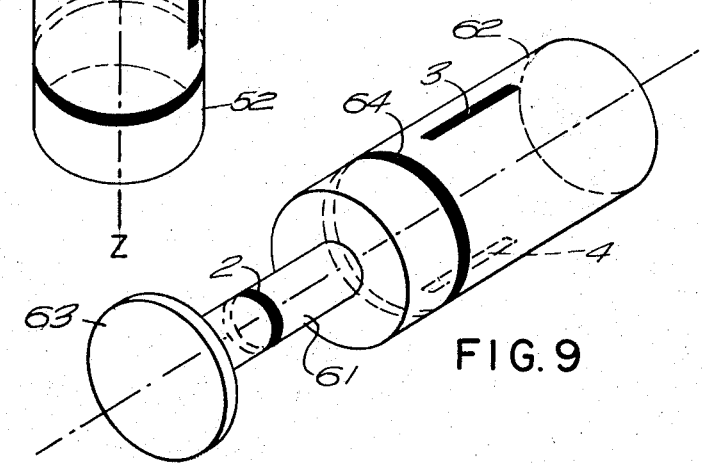

The invention, both as to its construction and manner of operation, can be better understood from the following exposition when considered in conjunction with the accompanying drawings in which:

FIG. 1 depicts an embodiment of the invention having the heated elements arranged upon a cylindrical refractory body, FIGS. 2 and 3 illustrate the aspects of the heated elements presented to streams flowing from various directions, FIG. 4 shows the scheme of electrical apparatus employing the invention to determine the direction and speed of a fluid stream, FIG. 5 illustrates the scheme of an alternative arrangement of electrical apparatus utilizing the invention to measure the direction and speed of a fluid stream, FIG. 6 shows an embodiment of the invention employing a conical surface to support the heated elements, FIG. 7 depicts an embodiment of the invention in which the supporting surface of revolution is a hemisphere, FIG. 8 illustrates an embodiment of the invention useful in resolving fluid flow components of velocity along different directions, FIG. 9 shows a form of the invention constructed to partially shield the sensing elements from being affected by undesired fluid flow components.

Referring now to the embodiment of the fluid flow sensor depicted in FIG. 1, the sensor employs a cylinder 1 made of a refractory material that is electrically non-conductive, such as aluminum oxide or aluminum silicate (mullite), or anodized aluminum. Disposed upon the surface of the cylinder are elements 2, 3, 4 consisting of thin metal films or metal conductors characterized by a relatively high temperature coefficient of resistance.

It is preferred that the conductors be of platinum or rhodium, although tungsten, gold and their alloys can be used. In addition to having a high temperature coefficient of resistance, the metal must be capable of adhering to the cylinder. As the elements 2, 3, and 4 are exposed to the fluid stream, the conductive film is of sufficient thickness to withstand erosion or abrasion by the fluid stream. For platinum and most refractory metals, the temperature coefficient of resistance is in the range from .0015 to .0025 per degree Fahrenheit. In that range, a sufficiently large resistance change occurs to permit very accurate measurement of temperature changes. The metal film can be placed on the refractory cylinder by sputtering, vapor deposition, or sintering techniques; those processes have resulted in a film that is tightly adherent to the refractory cylinder.

The sensor can be constructed by other techniques which employ wire conductors that have a non-zero temperature coefficient of resistivity. In one such technique shallow grooves are made in the surface of the refractory cylinder and fine wire conductors are placed in the grooves. The wire conductors can be fused to the cylinder by sintering or by the use of an adhesive. The surface of the cylinder is then ground down to remove part of the wire conductors. The term "thin film elements" is herein after used to denote the conductors on the refractory cylinder and applies to those conductors, whether they be wires or true films.

Thin film elements 2, 3, and 4 are formed as broad ribbons or strips upon the surface of cylinder 1. Element 2 is a ring that encircles the cylinder whereas elements 3 and 4 are parallel to the cylinder's longitudinal axis 5 and are separated from each other along the surface of the cylinder. A typical placement is to place the elements 3 and 4 diametrically opposite one another on the cylinder's surface. Each thin film element is heated by the electrical current which flows in the element when an electrical potential is applied to leads extending from the element. The leads are preferably platinum wires that protrude through bores in the refractory cylinder. In FIG. 1, the leads 6 are connected to diagonally opposite areas of thin film ring 2; leads 7 are connected to the ends of thin film strip 3; and leads 8 are connected to the ends of thin film strip 4.

Assuming the sensor to be immersed in a fluid stream whose direction of flow is perpendicular to the longitudinal axis 5 of the cylinder, the ring 2 presents the same aspect to the fluid stream regardless of the quadrant from which the stream comes. Consider for example the plane 9, in FIG. 2, in which the ring 2 lies, and a stream flowing in that plane. A stream flowing in the direction of arrow A sees the same aspect of ring 2 as a stream flowing in the direction of arrows B, C, or D. The ring 2, when heated, dissipates heat convectively in proportion to its temperature elevation above that of the passing fluid and in proportion to the square root of the fluid's velocity. As the stream flowing in plane 9 sees the same aspect of the ring regardless of the direction from which it flows, the amount of heat dissipated by convection in the stream depends principally upon the mass flow of the fluid and the temperature elevation of the ring. The heated thin film element, when operated at a small temperature elevation above that of the fluid stream, causes the sensor to be dominantly sensitive to fluid temperature variations; when operated at a large temperature elevation above that of the fluid stream, the sensor is dominantly sensitive to fluid velocity variations. The electrical current required to maintain the ring's temperature at a fixed elevation is, hence, indicative of the fluid's velocity, if the ring is maintained at a temperature which is very high with respect to the temperature of the fluid. The direction of the fluid stream in plane 9 cannot be ascertained from the electrical current supplied to ring 2 and the ring is therefore characterized as having a non-directional response to fluid motion.

A determination of the fluid stream's direction can be made from the cooling effect of the stream upon the heated film strips 3 and 4. When, as depicted in FIG. 3, the fluid flow is in a direction normal to the plane 10 which passes through strips 3 and 4, both sensing elements, if maintained at the same elevated temperature, convectively dissipate equal amounts of heat in the passing stream. The electrical currents required to maintain heated elements 3 and 4 at the same temperature are, consequently, equal. As the direction of fluid flow proceeds away from the direction normal to plane 10, cooling of elements 3 and 4 becomes unequal because of their changing aspect with respect to the fluid stream; the resulting unbalance in the currents required to maintain elements 3 and 4 at the same temperature, uniquely defines the direction of fluid flow when the velocity of the stream is known.

FIG. 4 shows the scheme of an arrangement in which the fluid flow sensor of FIG. 1 is employed to determine the stream's velocity and direction. Because the resistance of the thin film elements 2, 3, and 4 is a function of the electrical current flowing in it, the temperature of the film can be regulated by controlling the amount of current delivered to the film. The film ring 2 serves in the arrangement as one arm of a bridge 11 employing resistors 12, 13, and 14 as its other arms. Element 2 is indicated as a variable resistance because of its non-zero temperature coefficient of resistivity. The temperature coefficient of resistivity of resistors 12, 13, and 14 is preferably selected to be a zero or very low value and resistor 12 is additionally selected from among resistors having a large power dissipation rating. The bridge is energized from an electrical source 15 whose output is controlled by a current regulator 16, which is here illustrated as a transistor, although the regulator can be a vacuum tube or equivalent element whose impedance can be varied by an electrical signal. The function of current regulator 16 is to serve as a variable series impedance to control the amount of current passing through it to the bridge 11 and another bridge 17 constituted by thin film elements 3, 4 and resistors 18 and 19. Elements 3 and 4 are indicated as variable resistors to connote their non-zero temperature coefficient of resistivity.

A high gain differential amplifier 20 has its inputs coupled to bridge 11 at points 21 and 22 and the bridge is electrically excited by applying an electric potential between points 23 and 24. An electrical unbalance existing between points 21 and 22 causes differential amplifier 20 to deliver an unbalance signal to D.C. amplifier 25 which, in turn, adjusts the signal applied to the base of transistor 16 so that the current through the regulator changes in a manner restoring the balance of the bridge. The output of regulator 16 is a non-linear signal that is a function of the mass fluid flow past ring 2. The operating temperature level of film ring 2 is selected by adjusting variable resisitor 14 which establishes the initial condition for bridge balance. That is, the temperature at which film ring 2 is maintained is determined by the setting of variable resistor 14 because the feedback loop operates to adjust the current through the bridge until the resistance of film ring 2 attains that resistance which balances the bridge.

In the bridge 17, a differential amplifier 26 has its inputs coupled to points 27, 28 and the bridge excitation is applied at points 29 and 30. Bridge 17 is arranged to cause the bridge to be balanced so long as thin film elements 3 and 4 are equally cooled by the fluid stream in which they are immersed. A difference in cooling of heated thin film strips 3 and 4 results in unbalancing the bridge and the difference in electrical potential at points 27 and 28, which is enhanced at the output 31 of differential amplifier 26, indicates the direction of the fluid stream's flow.

Diagrammatically shown in FIG. 5 is an alternative arrangement employing the fluid flow sensor of FIG. 1 to determine the stream's velocity and direction. The thin film elements, in FIG. 5, are designated 2, 3, and 4 because those elements may be the same as the correspondingly numbered components in the FIG. 4 scheme. The bridge 11, amplifier 25 and current regulator 16 and electrical source 15 are identical, whether used in the arrangement of FIG. 4 or the arrangement of FIG. 5. The arrangement of FIG. 5 differs from that of FIG. 4 in that in the FIG. 5 scheme the thin film elements 3 and 4 are in separate bridges. Thin film element 3 is in an arm of bridge 32 having resistors 33, 34, and 35 in its other arms. Thin film element 4 is in an arm of bridge 36 having resistors 37, 38, and 9 in its other arms. Both of those bridges are energized from electrical source 15. In bridge 32, a high gain differential amplifier 40 has its inputs coupled to the bridge at points 41 and 42 and the bridge is electrically excited by applying an electric potential between points 43 and 44. An electrical unbalance between points 41 and 42 produced by a change in the resistance of element 3, causes the differential amplifier to emit a signal to D.C. amplifier 45 which, in turn, adjusts the signal applied to current regulator 46 so that the current through the regulator changes to balance the bridge. Bridge 36 functions in the same manner with respect to differential amplifier 47, D.C. amplifier 48, and current regulator 49, when an unbalance in that bridge is produced by a change in the resistance of element 4. A differential amplifier 50, having one input coupled to the output of current regulator 46 and its other input coupled to the output of current regulator 49, senses the difference between the outputs of those regulators to provide a signal which indicates the direction of flow of the fluid in which strip elements 3 and 4 are immersed. The signal which indicates the velocity of the fluid stream is obtained from the output of current regulator 16 because that current is controlled by the bridge 11 having ring element 2 in one of its arms.

Although the fluid flow sensor has been depicted in FIG. 1 as employing a cylindrical refractory body upon which the heated metal elements are disposed, the form of the body can have other configurations which provide geometric surfaces of revolution. For example, the refractory body, as depicted in FIG. 6, may be a cone having ring element 2 encircling the cone adjacent to its apex and having strip elements 3 and 4 extending in the direction of the cone's longitudinal axis. The refractory body may also take the form of a hemisphere, as shown in FIG. 7, with ring 4 being disposed to encircle a zone of the hemisphere and strips 3 and 4 placed so that they are normal to the ring and are on a great circle of the sphere. The shape of the fluid flow sensor body is selected so as to provide a minimum of disturbance to the fluid which flows past it.

The fluid velocity can be resolved into components along selected axes by employing a plurality sensor. For example, where it is desired to resolve the fluid's velocity along orthogonal axes X, Y, and Z, three cylindrical sensors 50, 51, 52 can be conjoined, as in FIG. 8, so that each sensor resolves the velocity component along one of the orthogonal axes.

An embodiment of the fluid flow sensor depicted in FIG. 9 is constructed to partially shield the velocity sensing ring 2 from fluid flow in the axial direction, that is, from fluid flow in the direction of axis 60. To accomplish that purpose, the refractory body has a cylindrical portion 61 of reduced diameter interposed between the larger cylindrical portion 62 and the shield 63. Ring element 2 encircles the smaller diameter cylinder 61 and strip elements 3 and 4 are mounted upon the surface of cylinder 62 and extend axially along the surface. The fluid flow sensor of FIG. 12 employs an additional ring 64, mounted upon cylinder 62, to preheat or bias the refractory body in order to increase the sensor's directional sensitivity where a large mean fluid flow is encountered and where the direction component that is desired is contained in a transient gust or in turbulent flow variations which are superimposed upon the mean fluid flow.

Direction sensing strips 3 and 4, in the FIG. 12 embodiment, are preheated from ring 64 by thermal conduction through cylinder 62. Because of the heat supplied by ring 64, the heating current through strips 3 and 4 is minimized as the current controller for those strips is required to supply only the relatively small current needed to maintain the strips in a heated condition rather than the larger current that is required to bring the mass of cylinder 62 up to the operational temperature. As the diameter of cylinder 61 is materially smaller than the diameter of cylinder 62, the amount of heat required to bring the mass of cylinder 61 up to operational temperature is considerably less than that required for the larger cylinder. Preferably, heated ring element 8 is disposed midway between the facing surfaces of the cylinder 62 and shield 63 and the symmetry of the sensor is preserved by having the shield of the same diameter as cylinder 62.

Although the refractory body of the fluid flow sensor has been described as being a solid, it is obvious that in any of the embodiments, the refractory body can be hollowed out to reduce its mass. Because variations in embodiments of the invention are possible, and indeed are apparent, in the light of the foregoing teaching, it is intended that the invention not be limited to the precise details of construction described or illustrated. Rather, it is intended that the scope of the invention be delimited by the appended claims and encompass such fluid flow sensors as do not in essence depart from the invention there defined.

I claim:
1. A fluid flow sensor comprising
a refractory body providing a geometric surface of revolution,
an electrically conductive ring adherent to the refractory body and encircling a portion of the body's surface, the conductive ring exhibiting a change in electrical resistivity as a function of temperature,
means providing electrical connections to the ring whereby an electrical current can be caused to flow in the ring,
a pair of electrically conductive strips adherent to the geometric surface of the body, each strip exhibiting a change in electrical resistivity as a function of temperature, the strips being spaced apart upon the body's surface and the longitudinal axis of each strip being angularly disposed to the ring,
and means providing electrical connections to each strip whereby each strip can be separately heated by electrical current flowing through it.

2. A fluid flow sensor comprising
a cylindrical body having an electrically insulative surface,
an electrically conductive ring adherent to the cylinder and encircling the cylinder's surface, the conductive ring being of a material exhibiting a change in resistivity as a function of temperature,
means providing electrical connections to spaced points on the conductive ring,
a pair of electrically conductive strips adherent to the surface of the cylinder, the conductive strips being of a material exhibiting a change in resistivity as a function of temperature, the electrically conductive strips being spaced apart on the surface of the cylinder and being arranged angularly with respect to the ring,
and means providing electrical connections to each of the strips.

3. A fluid flow sensor comprising
a cylindrical body having an electrically insulative surface,
an electrically conductive ring adherent to the cylinder and encircling the cylinder's surface, the conductive ring being of a material having a high temperature coefficient of resistivity,
means providing electrical connections to diagonally spaced points on the conductive ring,
a pair of electrically conductive strips adherent to the surface of the cylinder, the conductive strips being of a material having a high temperature coefficient of resistivity, the strips being parallel to the cylinder's longitudinal axis and being disposed on angularly separated portions of the cylinder's surface,
and means providing electrical connections to the ends of the strips.

4. A fluid flow sensor comprising:
insulative refractory means providing three geometric surfaces of revolution, the axis of each geometric surface of revolution being orthogonal to the axes of the other geometric surfaces of revolution;

each surface of revolution having an adherent electrically conductive ring centered about the axis of revolution, each conductive ring exhibiting a change in electrical resistivity as a function of temperature; and means providing electrical connections to each ring whereby an electrical current can be caused to flow in each ring.

References Cited

UNITED STATES PATENTS 2,870,305  1/1959  Ling _____ 73—204 X
3,138,025  6/1964  Fingerson _____ 73—204 X JAMES J. GILL, *Acting Primary Examiner.*

RICHARD C. QUEISSER, *Examiner.*

J. C. GOLDSTEIN, *Assistant Examiner.*